3,161,256
ACOUSTIC LOGGING TOOLS
George H. Pardue, Houston, Tex., assignor to Schlumberger Well Surveying Corporation, Houston, Tex., a corporation of Texas
Filed May 16, 1961, Ser. No. 110,472
5 Claims. (Cl. 181—.5)

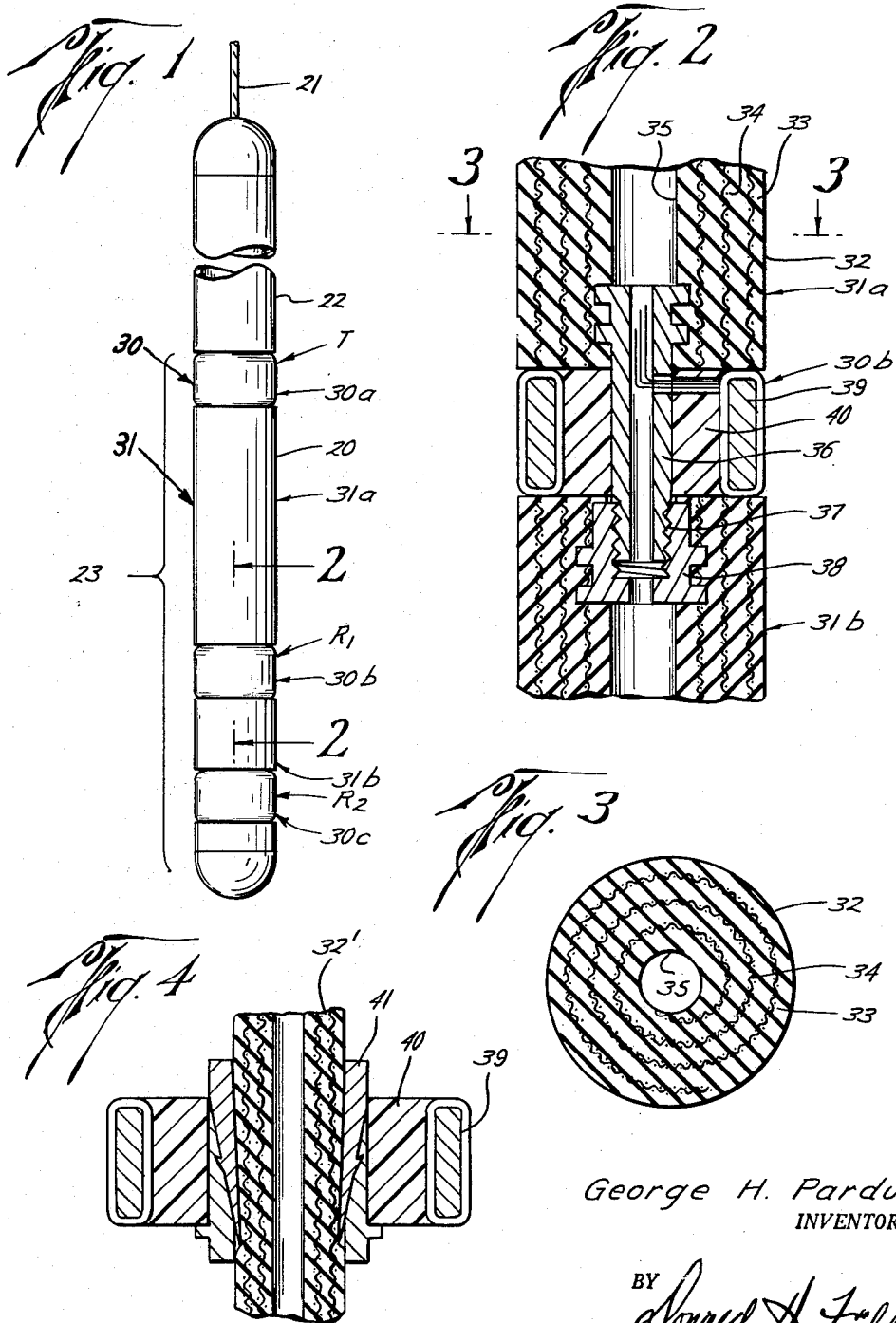

This invention relates to exploratory tools for use in well bores and, more particularly, to acoustic well logging tools which probe the media surrounding a well bore with pulses of acoustic energy.

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected and caused to trigger a timing circuit in the tool which functions to ascertain the time required for a given pulse of acoustic energy to travel the predetermined distance between the two receivers. From a time measurement obtained by the timing circuit, a composite velocity of media traversed by an acoustic pulse can be determined. In turn, composite velocity indications can be correlated to specific types of earth formations or other media. Indications of travel time or velocity obtained in open boreholes can also be related to the porosity of earth formations. If desired, the timing function can be accomplished with only a single transmitter and receiver.

Acoustic energy as above discussed can be generated or intercepted by a piezoelectric or a magnetostrictive transducers in a well known manner.

In a typical open borehole, an acoustic tool is commonly spaced from the wall of the well bore so that the emitted acoustic wave energy or pressure pulses are first omnidirectionally transmitted through the fluid (usually mud) in the well bore and, after traveling through the fluid over the distance from the tool to the wall of the well bore, a portion of the traveling wave energy is transmitted to adjacent earth formations. The characteristic velocity of wave motion or the wave energy through the fluids in the well is generally in the neighborhood of 5000 feet per second, while the characteristic velocity of wave motion through the earth formations may vary from 5000 feet per second to 25,000 feet per second. Thus, the portion of the acoustic wave energy transmitted into the formations generally travels at a higher velocity than the corresponding portion of the wave energy traveling in the well bore fluid. Because of this, the portion of the wave energy traveling through earth formations reaches a receiver prior to the time that the portion of the acoustic wave energy traveling through the fluids does. It is this feature of higher formation velocity which permits measurement of the velocity of acoustic energy in earth formations surrounding a borehole.

Typically, each pulse of acoustic energy upon intercepting a receiver transducer generates an electrical signal comprising a number of undulations, cycles or vibrations. The time measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the timing circuit can be developed. The characteristic voltage amplitude value selected for detection purposes is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted because of acoustic reflections in the borehole.

From the foregoing discussion concerning the nature of acoustic wave propagation in an open borehole and timing of such propagation over a fixed distance, it is apparent that a suitable supporting means for the transducers must be incapable of passing detectable acoustic energy longitudinally between the transducers at a velocity higher than that of the adjacent earth formations. Obviously, if the supporting means are not so constructed, the receiver circuit would be triggered prematurely by the acoustic energy traveling through the support means thereby preventing the timing circuit from obtaining a time value accurately related to the velocity of the adjacent earth formations or other media.

Heretofore, the housing or support means provided for supporting and spacing the transducers from one another have had low strength characteristics and either (1) a low velocity characteristic, or (2) the support means have had an attenuating characteristic to suppress the amplitude of the energy.

Accordingly, it is an object of the present invention to provide new and improved acoustic logging tools wherein the support has high strength qualities as well as an acoustical inhibition characteristic relative to the transmission of detectable acoustic energy lengthwise of the support between transducers.

A further object of the present invention is to provide new and improved acoustic logging tools having a relatively high strength and stiffness to withstand the shocks and forces inherently encountered in a logging operation.

Another object of the present invention is to provide acoustic logging tools with a support strong in tension to facilitate a fishing or retrieving operation if the tool should become temporarily immovable in the well bore.

Apparatus in accordance with the present invention includes an elongated, relatively stiff cylindrically shaped member for carrying at least one acoustic transducer. The generally cylindrical construction of the member is characterized by an elastomer material in which a wire mesh is embedded with a spiral curvature about the central axis of the construction. For ease of assembly and versatility, attaching means can be provided at the ends of the member.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 1 is a view of an acoustic logging tool embodying the present invention;

FIG. 2 is an enlarged view in longitudinal cross-section taken along line 2—2 of FIG. 1;

FIG. 3 is a view in cross-section taken along line 3—3 of FIG. 2; and

FIG. 4 is a view of a portion of a tool embodying still another configuration of the present invention.

In FIG. 1 there is illustrated an elongated and rigidly constructed acoustic logging tool 20 adapted for passage in the above described customary manner through a well bore (not shown) by means of an armored electrical cable 21 and winch (not shown) which is situated at the earth's surface. The tool 20 includes an upper, tubular cartridge or housing 22 and a lower, housing section 23. A centralizer support device (not shown) may be disposed at the center of gravity of the tool 20 if the tool is to be centered in a well bore. Alternatively, two or more centralized supports disposed along the length of the tool may be employed if so desired. Also, if desired, a caliper device (not shown) for measuring the diameter of the well bore may be coupled to the tool, for example, at its lower end.

Within the upper cartridge 22 are electronic components and circuits to periodically actuate the transmitter T and to perform the measuring function in response to signals from the receivers $R_1$ and $R_2$. The electronic circuits are coupled via cable 21 to conventional surface indicating and recorder instruments (not shown). Suitable electronic circuits may be found in the Patent No. 2,938,592 granted to C. J. Charske and hence need not not be further explained herein.

The lower, support section 23 includes three illustrative and similarly formed transducer sections identified by the number 30 and differentiated from one another by the letters $a$, $b$ and $c$. Transducer sections 30 may be separated from one another by identically formed acoustic inhibiting sections identified by the number 31 and differentiated from one another by the letters $a$ and $b$. In general, each transducer section 30 is constructed and arranged to permit and to facilitate the travel of acoustic energy in a generally radial pattern between a transducer and the fluids or muds (not shown) in the well bore which are exterior of the tubular housing. Also, in general, each acoustic inhibiting section 31 is constructed and arranged so as to attenuate and delay the acoustic energy traveling between transducer sections 30.

An acoustic inhibiting section 31 as illustrated in FIGS. 2 and 3 is a cylindrical member 32 of molded material 33 such as a rubber or elastomer in which a metallic, screen 34 of metal is embedded. In construction, a sheet of rubber and a screen 34 of metal are wrapped or wound about a core mandrel and cured to form the composite construction. Hence, the screen 34 spirals about the central axis of the tubular member 32 outwardly from a central opening 35 through the tubular member 32. Screen 34 has the usual perpendicular, interwoven strands.

The wire screen should be disposed relative to a lengthwise axis of the core mandrel so that the strands of the screen are diagonal relative to the length of member 32 in its molded configuration. Hence a direct longitudinal acoustic path through the wire members is avoided.

At one end of the tubular member 32, a tubular coupling member 36 is embedded therein and extends along the central axis of member 32. The terminal end portion 37 of coupling member 36 is threaded. In the remaining end of the member 32, a tubular, internally threaded socket 38 is embedded therein.

In assembly, a transducer 39 is mounted on a suitable tubular spacer 40 made of "Teflon," for example, and the spacer 40 is received on the coupling member 36. The coupling member 36 may then be threaded into the socket 38 in an adjacent tubular member thereby to fix the transducer 39 between adjacent tubular members which constitute acoustic inhibiting sections 31. The tubular construction of coupling member 36 and socket member 38 permit the passage of electrical conductors therethrough. By means of the complementary end connections on individual tubular members, different lengths of inhibiting sections may be interchanged to vary the spacing or span between transducers with little or no difficulty. The wire screen because of its bias wrapping is a poor conductor of acoustic energy but is an excellent strength reinforcement for the elastomer material so that in combination a rigid durable support is provided. Elastomer material 33 should, of course, have a low velocity characteristic and high strength qualities, such as 70 Shore durometer synthetic rubber.

Referring now to FIG. 4, a transducer 39 and spacer 40 may be directly supported on a tubular member 32' constructed as above described, by means of a suitable fastening device 41. Hence, the composite tube 32' because of its low velocity characteristics provides an excellent rigid support for transducers where a rigid support is desirable.

In the disclosed arrangements, the transducers are so arranged that they are exposed to well fluids. However, if desired, the transducers could be encapsulated or enclosed within a rubber or other low velocity material to provide a fluid tight boot. In such an arrangement, the interior of the fluid tight boot would be oil-filled for sound transmission purposes. Also, if desired the member 32 need not necessarily be tubular as conductors could be passed along grooves in an outer wall. The screen 34 can be a woven wire mesh or expanded metal.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for use in well bores including an elongated cylindrically shaped assembly which includes: a support member composed of an elastomer material and a screen of metal with intercoupled strands embedded in said material, said screen having a spiral curvature about a central axis of the support member with the strands disposed diagonally to the central axis, and at least one acoustic transducer secured to said support member.

2. Apparatus for use in well bores including an elongated cylindrically shaped assembly which includes a support member composed of an elastomer material and a screen of metal with intercoupled strands embedded in said material, said screen having a spiral curvature about a central axis of the support member with the strands disposed diagonally to the central axis, a coupling member and a socket member respectively attached to the ends of said support member, said coupling member and socket member having complementary threaded portions for coupling with other members, and at least one acoustic transducer adapted to be received on said coupling member.

3. Apparatus for use in well bores including an elongated cylindrically shaped assembly which includes a plurality of support members each composed of an elastomer material and a screen of metal with intercoupled strands embedded in said material wherein said screen has a spiral curvature about a central axis of a support member with the strands disposed diagonally to the central axis, each of said support members having a coupling member and a socket member at its respective ends which socket and coupling members have complementary threaded portions, and an acoustic transducer received by the coupling member between two adjacent, threadedly coupled, support members.

4. Apparatus for use in well bores including an elongated cylindrically shaped assembly which includes a plurality of support members each composed of an elastomer material and a screen of metal with intercoupled strands embedded in said material wherein said screen has a spiral curvature about a central axis of the support member with the strands disposed diagonally to the central axis, at least one of said support members having an extension member at one of its ends for coupling with another support member, and at least one acoustic transducer adapted to be received by said one extension member.

5. Apparatus for use in well bores including an elongated cylindrically shaped assembly which includes a plurality of support members each composed of an elastomer material and a screen of metal with intercoupled strands embedded in said material wherein said screen has a spiral curvature about a central axis of the support member with the strands disposed diagonally to the central axis, said support members having attaching means at their respective ends for coupling said members in an end-to-end relation, said attaching means including an extension which spaces said support members from one another, and an acoustic transducer mounted on said extension.

References Cited in the file of this patent
UNITED STATES PATENTS

| | | |
|---|---|---|
| 2,834,421 | Summers | May 13, 1958 |
| 2,938,592 | Charske et al. | May 31, 1960 |
| 3,009,131 | Woodworth | Nov. 14, 1961 |